United States Patent
Muthiah

(10) Patent No.: US 12,373,288 B2
(45) Date of Patent: Jul. 29, 2025

(54) ERROR HANDLING IN KEY-VALUE SOLID STATE DRIVES

(71) Applicant: WESTERN DIGITAL TECHNOLOGIES, INC., San Jose, CA (US)

(72) Inventor: Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 106 days.

(21) Appl. No.: 18/235,963

(22) Filed: Aug. 21, 2023

(65) Prior Publication Data

US 2025/0068514 A1 Feb. 27, 2025

(51) Int. Cl.
*G06F 11/10* (2006.01)
*G06F 11/07* (2006.01)

(52) U.S. Cl.
CPC ...... *G06F 11/1068* (2013.01); *G06F 11/0793* (2013.01)

(58) Field of Classification Search
None
See application file for complete search history.

(56) References Cited

U.S. PATENT DOCUMENTS

| | | | |
|---|---|---|---|
| 9,684,464 B2 | 6/2017 | Takeuchi | |
| 11,150,839 B2 | 10/2021 | Muthiah | |
| 2006/0179388 A1 | 8/2006 | Choi | |
| 2009/0213938 A1* | 8/2009 | Lee | H04N 19/61 375/E7.076 |
| 2013/0170559 A1 | 7/2013 | Schink | |
| 2014/0157053 A1* | 6/2014 | Mozak | G11C 29/52 714/32 |
| 2017/0013045 A1* | 1/2017 | Predmore | H04L 67/1097 |
| 2018/0074902 A1* | 3/2018 | Araujo | G06F 11/1092 |
| 2021/0083861 A1 | 3/2021 | Hiwada | |
| 2021/0377590 A1* | 12/2021 | Muthiah | H04L 65/80 |
| 2021/0382858 A1* | 12/2021 | Wang | G06F 3/0685 |
| 2023/0086696 A1* | 3/2023 | Chen | G06F 3/065 714/801 |

* cited by examiner

*Primary Examiner* — Guerrier Merant
(74) *Attorney, Agent, or Firm* — Arlene P. Neal; Neal Blibo LLC

(57) ABSTRACT

A key-value storage device may perform error-handling on key-value data stored in a memory device. The key-value storage device may be communicatively coupled to a host device that may transmit read commands to retrieve the key-value data stored on the memory device. In response to a read command, the storage device may retrieve the key-value data from the memory device. If during retrieval the storage device identifies that a portion of the key-value data is irretrievable, the storage device may perform an error-handling operation on the key-value data. Depending on a key-value data type, the storage device may perform an error concealment operation and return complete key-value data or a partial error-handling operation and return partial key-value data to the host.

15 Claims, 5 Drawing Sheets

ERROR HANDLING IN KEY-VALUE SOLID STATE DRIVES

BACKGROUND

A host may transmit a command to read data from and/or write data to, for example, a flash memory device coupled to a storage device. The storage device may be a block-based storage device or a key-value storage device. The block-based storage device may store data in blocks of a fixed size on the memory device and may address the data using logical block addresses that may be mapped one-to-one to physical addresses on the memory device. When the host transmits data to be written to the memory device, the host may associate one or more logical block addresses with the data, wherein each logical block address may be associated with a sector of, for example, 512 bytes.

When the block-based storage device receives a write command from the host, the block-based storage device may perform fragmenting on the data by breaking up or accumulating the host data into uniform-sized fragments before sending the data to the memory device. For example, depending on the configuration of the storage device, the data may be divided into fragments (Flash Management Units (FMUs)) of, for example, 4 Kilobytes (KB). Fragmenting of the data may aid in mapping the logical addresses associated with the host data to physical addresses in the memory device. The block-based storage device may use the mappings to store data and retrieve the data from the memory device.

Consider an example where the host transmits a 1 Megabyte (MB) file to be stored on the memory device. The block-based storage device may fragment the data into 4 KB FMUs before sending the data to the memory device. When the host requests the file from the memory device, if an error occurs such that the block-based storage device is unable to access/retrieve one or more of the FMUs associated with the file, the block-based storage device may retrieve the accessible FMUs and provide an indication to the host of the FMU(s) with the error. The host may execute one or more error-handling algorithms to retrieve or recreate the data associated with the erroneous FMU(s). However, maintaining the logical-to-physical mappings may decrease the number of transactions executed by the block-based storage device and increase latency at the block-based storage device.

The key-value storage device may store variable-length data as a single value in contiguous bytes on the memory device. The value may not be updated or extended in place when stored on the memory device. The key-value storage device may address the value with a unique key associated with the value, wherein the value may be stored and retrieved from the memory device as one addressable object. For example, the key-value storage device may store a photo with an associated key or a video with an associated key as a single addressable value. The key-value storage device may also store, for example, a medical record with a unique identifier or an employment record with a unique identifier as a single value. By directly mapping the key to a physical location on the memory device, the key-value storage device may increase processing time by not having to maintain the logical-to-physical mappings, thereby potentially increasing the number of transactions executed on the key-value storage device and reducing a latency on the key-value storage device. However, because the key-value storage device may retrieve the entire value as a single value/object, if an error occurs when the key-value storage device tries to retrieve the value, the key-value storage device may be unable to retrieve and transmit non-erroneous portions of the data to the host.

SUMMARY

In some implementations, a key-value storage device performs error-handling on key-value data stored in a memory device. The key-value storage device may be communicatively coupled to a host device that transmits read commands to retrieve the key-value data stored on the memory device. The storage device may include a processor to retrieve the key-value data from the memory device. The processor may identify that a portion of the key-value data is irretrievable from the memory device and may perform an error-handling operation on the key-value data. Depending on a key-value data type, the processor may return complete key-value data or partial key-value data to the host.

In some implementations, a method is provided to perform error handling in a key-value storage device communicatively coupled to a host. The method includes receiving, by the storage device from the host device, a command to retrieve key-value data from the memory device. The storage device may determine that a portion of the key-value data is irretrievable from the memory device. Based on a key-value data type, the storage device may identify an error-handling operation to be performed on the key-value data and execute the error-handling operation on the key-value data. The storage device may return, to the host, complete key-value data or partial key-value data.

In some implementations, the storage device may include an error-handling module to identify, based on a key-value data type, an error-handling operation to be performed on the key-value data. The error-handling module may execute an error concealment operation to conceal an error encountered when retrieving the key-value data stored as a single addressable object. The error-handling module may also execute a partial error-handling operation to provide retrievable portions of the key-value data to the host when a key in a key-value pair is a unique identifier.

Figure 1:
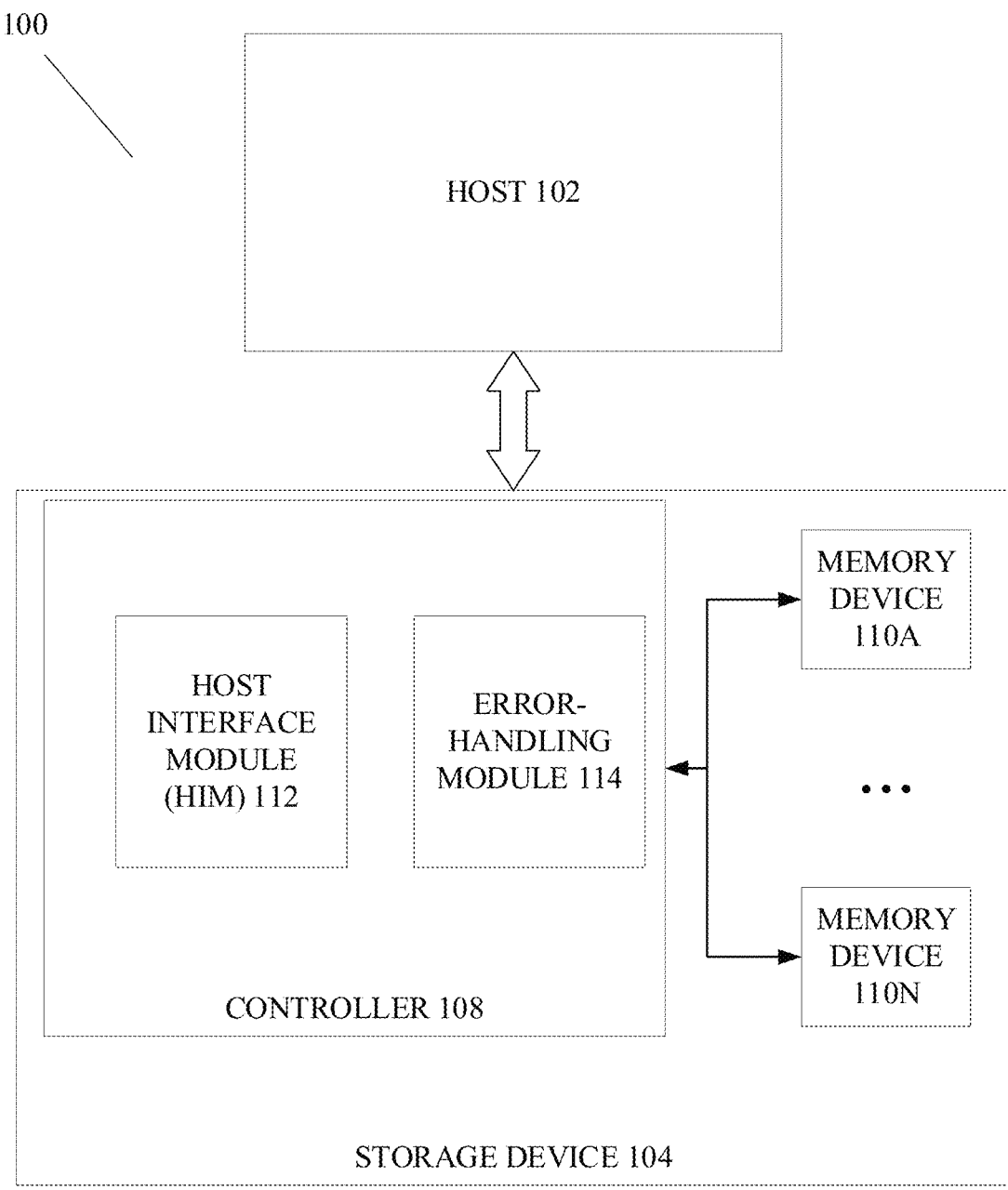
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 may transmit commands to read data from or write data to storage device 104. Host 102 and storage device 104 may be in the same physical location as components on a single computing device or on different computing devices that are communicatively coupled. Storage device 104, in various embodiments, may be disposed in one or more different locations relative to the host 102. Host 102 may include additional components (not shown in this figure for the sake of simplicity).

Storage device 104 may be a key-value storage device including a controller 108 with a host interface module (HIM) 112 and an error-handling module 114. Storage device 104 may also include one or more memory devices 110a-110n (referred to herein as memory device(s) 110). Storage device 104 may be, for example, a solid-state drive (SSD), and the like.

Memory device 110 may be flash based, including, for example, NAND flash memory. Memory device 110 may be included in storage device 104 or may be otherwise communicatively coupled to storage device 104. Variable length data (also referred to herein as a value/data in a key-value pair) may be stored in memory device 110 and may be addressed by a unique variable length key. Storage space in memory device 110 may be allocated in increments of bytes, wherein a necessary amount of physical storage may be associated with the variable length value. Storage device 104 may provide and/or maintain a mapping of the key to variable length value as stored on memory device 110.

Controller 108 may execute background operations to manage resources on memory device 110. For example, controller 108 may monitor memory device 110 and may execute garbage collection and other relocation functions per internal relocation algorithms to refresh and/or relocate the data on memory device 110. Controller 108 may also process foreground operations including instructions transmitted from host 102. For example, controller 108 may read data from and/or write data to memory device 110 based on instructions received from host 102.

Host interface module 112 may interface with host 102 and may receive commands and data from host 102. When host 102 transmits a command to storage device 104, host interface module 112 may receive the command and determine if the command is, for example, a write command, a read command, or an administration command. If the command received from host 102 is a write command, host interface module 112 may perform chunking on the host data and may break up or accumulate the host data into uniform-sized chunks/fragments before sending the data to memory device 110. Exemplary fragments (Flash Management Units (FMUs)) sizes may be 4 KB, 8 KB, 16 KB, 32 KB, etc.

In an example where host interface module 112 breaks up or accumulates the host data into 4 KB FMUs, when host interface module 112 receives a write command with a 512 KB value and a key from host 102, host interface module 112 may break up the 512 KB data into 128-4 KB FMUs. Each of the 128 FMUs may be associated with the key assigned to the value. When host 102 transmits a command to storage device 104 to retrieve the 512 KB value, controller 108 may use the key to retrieve all 128 FMUs.

While retrieving a value from memory device 110, storage device 104 may encounter an error such that one or more portions of the data may be irretrievable. Irretrievable data may be data including an error and/or data that may be unreturnable to host 102. Based on predefined error-handling protocols, error-handling module 114 may perform error-handling operations on the key-value data when a portion of the key-value data is irretrievable from the memory device and/or is otherwise unreturnable to host 102. Based on a value type, after performing the error-handling operations on the key-value data, storage device 104 may return a complete value or a partial value to host 102.

Host 102 may establish an error concealment protocol with storage device 104. As part of the error concealment protocol, error-handling module 114 may perform error-handling operations to conceal an error encountered when retrieving a predefined type of value. After concealing the errors, storage device 104 may return a complete value to host 102. For example, error-handling module 114 may execute the error concealment protocol for use cases including single addressable values/objects such as images or video frames.

When error-handling module 114 executes concealment operations, storage device 104 may be authorized to return an approximate or recreated value as a complete value to host 102. The approximate value may include the non-erroneous portions of the value retrieved from memory device 110 and may be an approximate and complete value of the requested data. The approximate value may also be a value recreated from stubbing the erroneous portions of the value with zeros or a predefined signature or a value recreated from the retrieved non-erroneous portions of the value, wherein the value may be recreated using one or more error-handling algorithms. Using the error concealment protocol, host 102 may establish or predefine the parameters of when and how error-handling module 114 may create the approximate/recreated value. In some implementations, the approximate/recreated value returned to host 102 may be sufficient for host 102 to continue its processing.

When storage device 104 receives a request from host 102 for a single addressable value/object associated with a key and in retrieving the value determines that one or more FMUs associated with the value are irretrievable, error-handling module 114 may further parse the value to determine if the value is one on which error concealment operations may be performed. If the value is one on which error concealment operations may be performed, error-handling module 114 may establish a start offset and an end offset of the object in the FMUs. Error-handling module 114 may then execute concealment operations to recreate or approximate the complete value, wherein the approximate/recreated value may not be the same as the original value but may be equivalent to the original value. Storage device 104 may return the approximate/recreated value to host 102.

Consider an example where host 102 requests an image or video stored on memory device 110. In key-value storage device 104, the data/value associated with the image/video may be accessed and retrieved as a single addressable object rather than as individual FMUs associated with logical block addresses that must be further processed to be associated as a single addressable object. As such, storage device 104 may use the key in the key-value architecture to identify all FMUs associated with the image/video. If storage device 104 determines that one or more FMUs associated with the key for the image/video are lost/corrupted or are otherwise irretrievable, storage device 104 may determine if the value associated with the image/video is one on which error concealment operations can be executed.

Error-handling module 114 may establish a start offset and an end offset of the object in the FMUs. Error-handling module 114 may execute concealment operations on the retrievable FMUs associated with the image/video. For example, error-handling module 114 may use the retrievable neighboring frames in the image/video to recreate the lost/corrupted frame(s). After executing the concealment operation, storage device 104 may return the recreated image/video to host 102 for further processing.

Host 102 may also establish a partial error-handling protocol with storage device 104. Error-handling module 114 may execute partial error-handling operations when data recreation or approximation by storage device 104 may not be acceptable to host 102. As part of the partial error-handling protocol, storage device 104 may provide retrievable portions of a value containing one or more errors that are encountered when storage device 104 is retrieving specific types of key-value data. Error-handling module 114 may execute the partial error-handling protocol for use cases wherein the value in the key-value pair serves as a unique identifier, for example, for medical or employment records. When error-handling module 114 executes partial error-handling operations, storage device 104 may return the value to host 102 in multiple portions, circumventing those portions in the data containing an error.

When storage device 104 receives a request from host 102 for a value serving as a unique identifier, in retrieving the value, storage device 104 may determine that one or more FMUs associated with a value are irretrievable. Storage device 104 may further determine that the value is one on which partial error-handling operations can be executed. Error-handling module 114 may obtain the erroneous byte offset and the length of irretrievable data for each error encountered. Storage device 104 may provide the erroneous byte offset and the length of the irretrievable data to host 102. Using the erroneous byte offset and the length of irretrievable data, host 102 may request a portion of the value until a first failure is encountered, a portion of the value starting after the first failure up to the next failure, a portion of the value starting after the second failure up to the next failure, and so on, until all retrievable FMUs associated with the value are requested. This may allow controller 108 to return the retrievable portions of the value to host 102, circumventing those portions in the value containing error(s).

Consider an example where host 102 requests a 512 KB value in a key-value pair associated with a value serving as a unique identifier for a medical record. If the 512 KB value is stored in 128 4 KB FMUs on memory device 110 and storage device 104 determines that one or more of the 128 4 KB FMUs is irretrievable, storage device 104 may determine that the value is one on which partial error-handling operations can be performed. Error-handling module 114 may obtain the erroneous byte offset and the length of irretrievable data for each error encountered. For example, if storage device 104 determines that the data at FMU 20 to FMU 22 and FMU 83 to FMU 86 is irretrievable, error-handling module 114 may obtain the byte offset for FMU 20 and the length of the data for FMUs 20-22, and the byte offset for FMU 83 and the length of the data for FMUs 83-86 and return these byte offsets and lengths to host 102. Host 102 may then make multiple requests for the data, including a first request for a portion of the value that is retrievable prior to the first error (i.e., the value in FMUs 0-19), a second request for a portion of the value that is retrievable from the end of the first error up to the beginning of the second error or the end of the data (i.e., the value in FMUs 23-82), and a third request for a portion of the value that is retrievable from the end of the second error up to the beginning of the third error or the end of the data (i.e., the value in FMUs 87-127). Storage device 104 may retrieve the values in FMUs 0-19, FMUs 23-82, and FMUs 87-127 and return those values to host 102 for further processing. Thus, storage device 104 may provide consistent data in a key-value architecture even in cases of failures.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
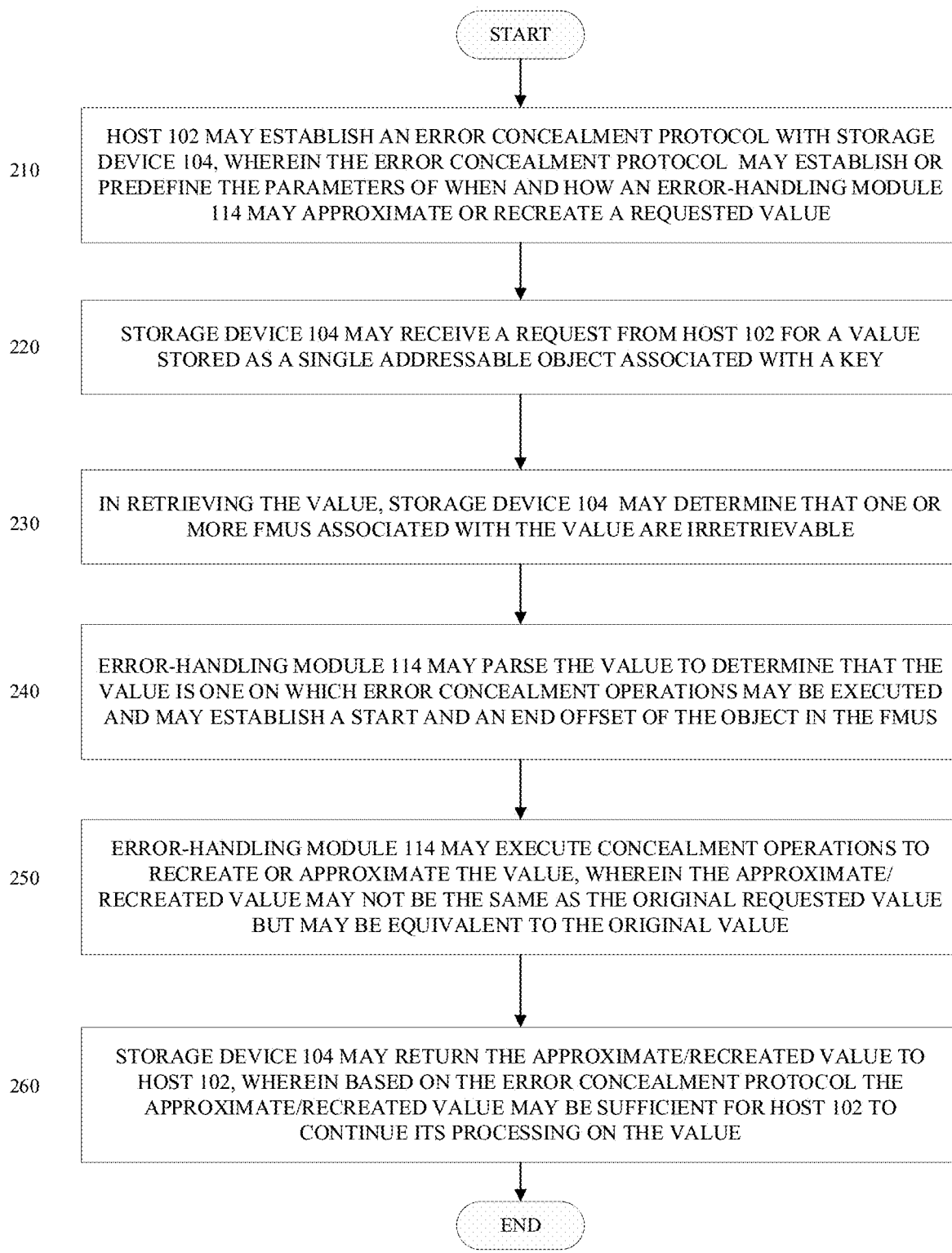
FIG. 2 is a flow diagram of an example process for executing error concealment in a key-value storage device in accordance with some implementations.

FIG. 2 is a flow diagram of an example process for executing error concealment in a key-value storage device in accordance with some implementations. At 210, host 102 may establish an error concealment protocol with storage device 104, wherein the error concealment agreement may establish or predefine the parameters of when and how an error-handling module 114 may approximate or recreate a requested value. At 220, storage device 104 may receive a request from host 102 for a value stored as a single addressable object associated with a key. At 230, in retrieving the value, storage device 104 may determine that one or more FMUs associated with the value are irretrievable. At 240, error-handling module 114 may further parse the value to determine that the value is one on which error concealment operations may be executed and may establish a start and an end offset of the object in the FMUs. At 250, error-handling module 114 may execute concealment operations to recreate or approximate the value, wherein the approximate/recreated value may not be the same as the original requested value but may be equivalent to the original value. At 260, storage device 104 may return the approximate/recreated value to host 102, wherein based on the error concealment protocol the approximate/recreated value may be sufficient for host 102 to continue its processing on the value. As indicated above FIG. 2 is provided as an example. Other examples may differ from what is described in FIG. 2.

Figure 3:
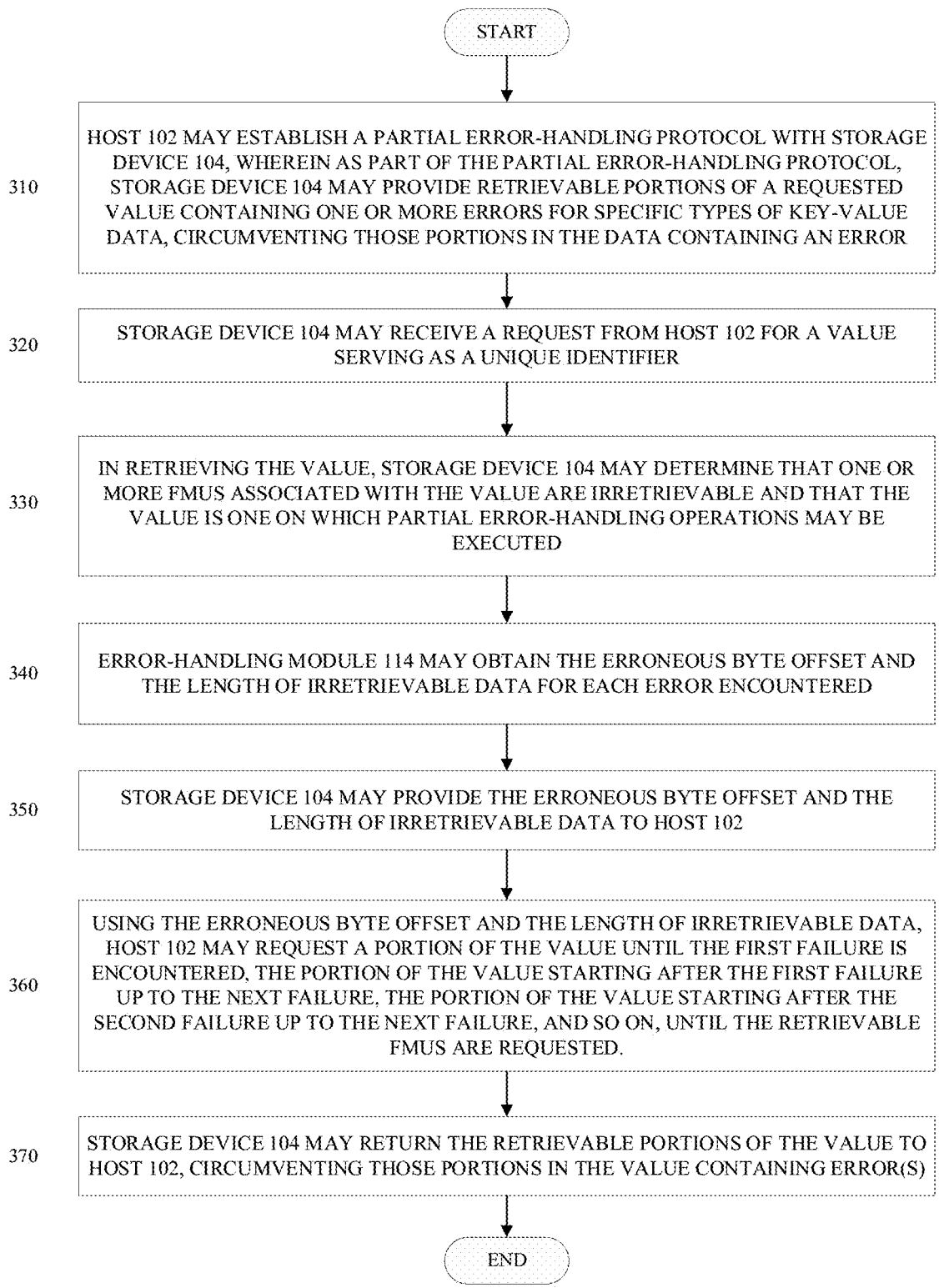
FIG. 3 is a flow diagram of an example process for executing partial error handling in a key-value storage device in accordance with some implementations.

FIG. 3 is a flow diagram of an example process for executing partial error-handling in a key-value storage device in accordance with some implementations. At 310, host 102 may establish a partial error-handling protocol with storage device 104, wherein as part of the partial error-handling protocol storage device 104 may provide retrievable portions of a requested value containing one or more errors for specific types of key-value data, circumventing those portions in the data containing an error.

At 320, storage device 104 may receive a request from host 102 for a value serving as a unique identifier. At 330, in retrieving the value, storage device 104 may determine that one or more FMUs associated with the value are irretrievable and that the value is one on which partial error-handling operations may be executed. At 340, error-handling module 114 may obtain the erroneous byte offset and the length of irretrievable data for each error encountered. At 350, storage device 104 may provide the erroneous byte offset and the length of irretrievable data to host 102. At 360, using the erroneous byte offset and the length of irretrievable data, host 102 may request a portion of the value until the first failure is encountered, the portion of the value starting after the first failure up to the next failure, the portion of the value starting after the second failure up to the next failure, and so on, until the retrievable FMUs are requested. At 370, storage device 104 may return the retrievable portions of the value to host 102, circumventing those portions in the value containing error(s). As indicated above FIG. 3 is provided as an example. Other examples may differ from what is described in FIG. 3.

Figure 4:
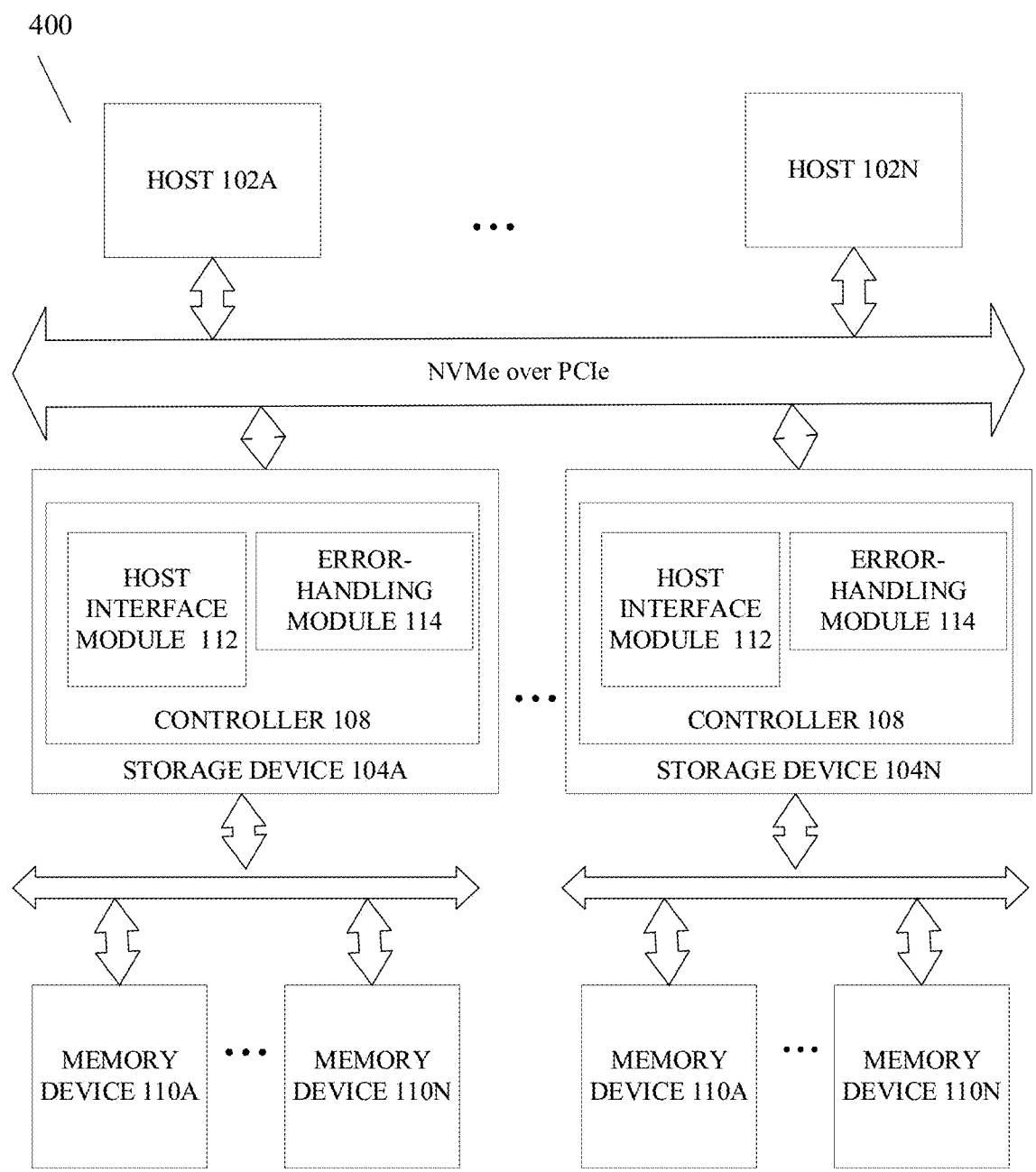
FIG. 4 is a diagram of an example environment in which systems and/or methods described herein are implemented.

FIG. 4 is a diagram of an example environment in which systems and/or methods described herein are implemented. As shown in FIG. 4, Environment 400 may include hosts 102-102n (referred to herein as host(s) 102), and storage devices 104a-104n (referred to herein as storage device(s) 104).

Storage device 104 may be a key-value storage device that includes a controller 108 to manage the resources on storage device 104. Controller 108 may include a host interface module 112 and an error-handling module 114 to perform error handling when retrieving data associated with a key-value pair. Controller 108 may improve the performance of storage device 104 by retrieving an approximate value or portions of a value including one or more errors. Hosts 102 and storage devices 104 may communicate via Non-Volatile Memory Express (NVMe) over peripheral component interconnect express (PCI Express or PCIe) standard, or the like.

Devices of Environment 400 may interconnect via wired connections, wireless connections, or a combination of wired and wireless connections. For example, the network of FIG. 4 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of Environment 400 may perform one or more functions described as being performed by another set of devices of environment 400.

Figure 5:
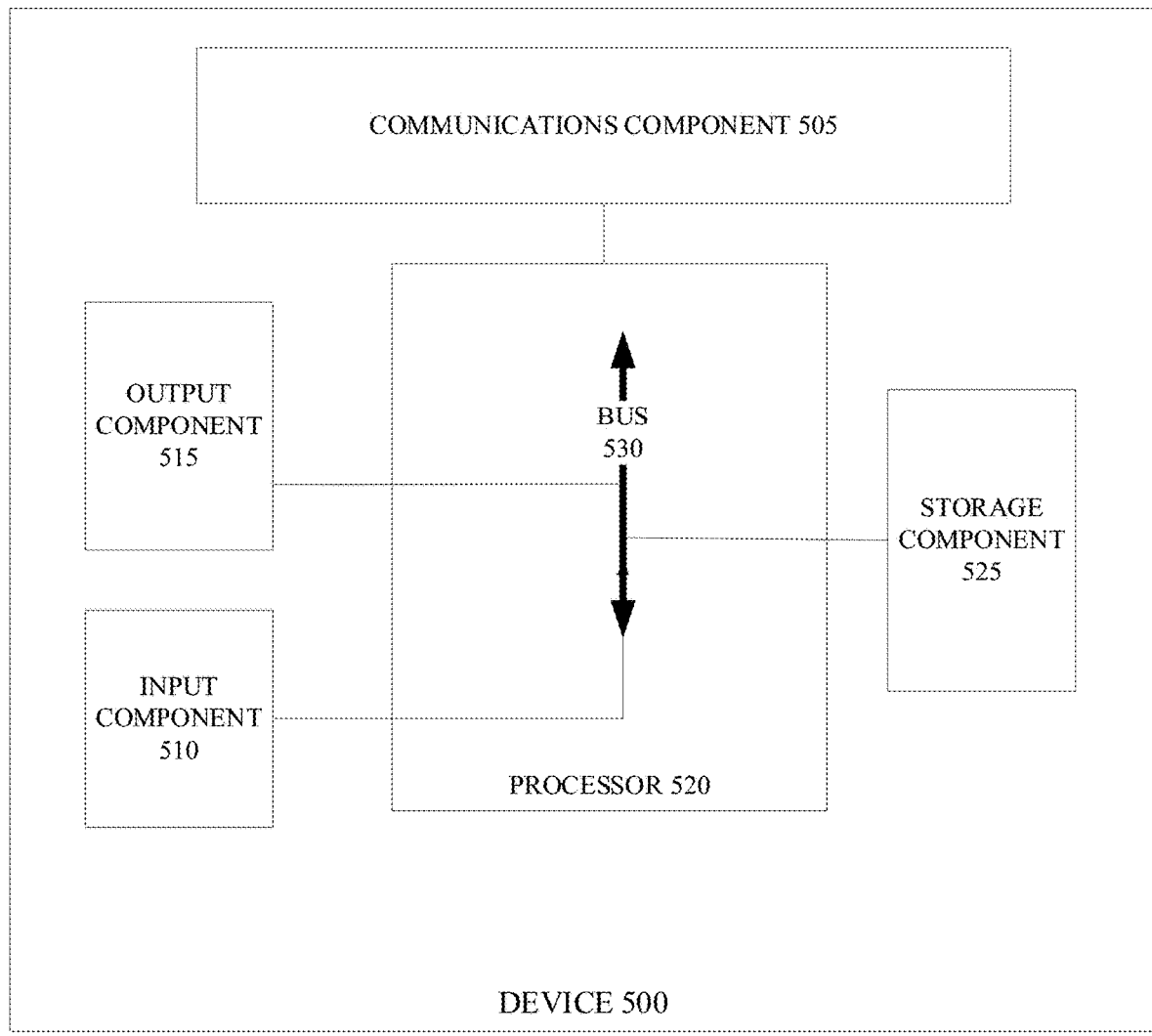
FIG. 5 is a diagram of example components of the host of FIG. 1.

FIG. 5 is a diagram of example components of one or more devices of FIG. 1. In some implementations, host 102 may include one or more devices 500 and/or one or more components of device 500. Device 500 may include, for example, a communications component 505, an input component 510, an output component 515, a processor 520, a storage component 525, and a bus 530. Bus 530 may include components that enable communication among multiple components of device 500, wherein components of device 500 may be coupled to be in communication with other components of device 500 via bus 530.

Input component 510 may include components that permit device 500 to receive information via user input (e.g., keypad, a keyboard, a mouse, a pointing device, a microphone, and/or a display screen), and/or components that permit device 500 to determine the location or other sensor information (e.g., an accelerometer, a gyroscope, an actuator, another type of positional or environmental sensor). Output component 515 may include components that provide output information from device 500 (e.g., a speaker, display screen, and/or the like). Input component 510 and output component 515 may also be coupled to be in communication with processor 520.

Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 may include one or more processors capable of being programmed to perform a function. Processor 520 may be implemented in hardware, firmware, and/or a combination of hardware and software.

Storage component 525 may include one or more memory devices, such as random-access memory (RAM) 114, read-only memory (ROM), and/or another type of dynamic or static storage device (e.g., a flash memory, a magnetic memory, and/or optical memory) that stores information and/or instructions for use by processor 520. A memory device may include memory space within a single physical storage device or memory space spread across multiple physical storage devices. Storage component 525 may also store information and/or software related to the operation and use of device 500. For example, storage component 525 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 505 may include a transceiver-like component that enables device 500 to communicate with other devices, such as via a wired connection, a wireless connection, or a combination of wired and wireless connections. The communications component 505 may permit device 500 to receive information from another device and/or provide information to another device. For example, communications component 505 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 505 may also include one or more broadband and/or narrowband transceivers and/or other similar types of wireless transceiver configurable to communicate via a wireless network for infrastructure communications. Communications component 505 may also include one or more local area network or personal area network transceivers, such as a Wi-Fi transceiver or a Bluetooth transceiver.

Device 500 may perform one or more processes described herein. For example, device 500 may perform these processes based on processor 520 executing software instructions stored by a non-transitory computer-readable medium, such as storage component 525. As used herein, the term "computer-readable medium" refers to a non-transitory memory device. Software instructions may be read into storage component 525 from another computer-readable medium or from another device via communications component 505. When executed, software instructions stored in storage component 525 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

I claim:

1. A key-value storage device to perform error-handling on key-value data stored in a memory device, the key-value storage device is communicatively coupled to a host device that transmits read commands to retrieve the key-value data stored on the memory device, the storage device comprises:
a processor to retrieve the key-value data from the memory device, identify that a portion of the key-value data is irretrievable from the memory device, wherein the processor includes an error-handling module to
perform an error-handling operation on the key-value data, and, depending on a key-value data type, return one of a complete key-value data and a partial key-value data, to the host; wherein the error-handling module is configured to perform an error concealment operation depending on the key-value data type, wherein the error concealment operation conceals an error encountered when retrieving the key-value data and wherein when a fragment of the key-value data is irretrievable, the error-handling module parses the key-value data to determine that the key-value data is one on which the error concealment operation is to be performed, establishes a start offset and an end offset of the key-value data, and executes the error concealment operation to recreate the key-value data.

2. The storage device of claim 1, wherein the error concealment operation is performed when the key-value data is stored as a single addressable object.

3. The storage device of claim 1, wherein the complete value is a value created from non-erroneous portions of the key-value data retrieved from the memory device.

4. The storage device of claim 1, wherein an error-handling module executes a partial error-handling operation depending on the key-value data type, wherein the partial error-handling operation provides retrievable portions of the key-value data to the host.

5. The storage device of claim 4, wherein the partial error-handling operation is executed when a value in a key-value pair is a unique identifier.

6. The storage device of claim 4, wherein the processor returns the key-value data to the host in multiple portions, circumventing those portions in the key-value data containing an error.

7. The storage device of claim 4, wherein when a fragment of the key-value data is irretrievable, the error-handling module parses the key-value data to determine that the key-value data is one on which the partial error-handling operation is to be performed, obtains an erroneous byte offset and a length of irretrievable key-value data for each error encountered, and provides the erroneous byte offset and the length of the irretrievable key-value data to the host.

8. The storage device of claim 1, wherein the storage device receives multiple requests from the host for the key-value data, each request being for a portion of the key-value data that does not include an error, and wherein the storage device returns retrievable portions of the key-value data to the host, circumventing portions in the key-value data including the error.

9. A method to perform error-handling in a key-value storage device communicatively coupled to a host, the method comprises: receiving, by the storage device from a host device, a command to retrieve key-value data from a memory device; determining, by the storage device, that a portion of the key-value data is irretrievable from the memory device; identifying, by the storage device based on a key-value data type, an error-handling operation to be performed on the key-value data; executing, by the storage device, the error-handling operation on the key-value data; performing an error concealment operation to conceal an error encountered when retrieving the key-value data stored as a single addressable object; wherein when a fragment of the key-value data is irretrievable, the method further comprises parsing the key-value data to determine that the key-value data is one on which the error concealment operation is to be performed, establishing a start offset and an end offset of the key-value data, and executing the error concealment operation to recreate the key-value data; and returning, by the storage device to the host, one of a complete key-value data and a partial key-value data.

10. The method of claim 9, further comprising creating the complete value from non-erroneous portions of the key-value data retrieved from the memory device.

11. The method of claim 9, further comprising performing a partial error-handling operation to provide retrievable portions of the key-value data to the host when a key in a key-value pair is a unique identifier.

12. The method of claim 11, further comprising returning the key-value data to the host in multiple portions, circumventing those portions in the key-value data containing an error.

13. The method of claim 11, wherein when a fragment of the key-value data is irretrievable, the method further comprises parsing the key-value data to determine that the key-value data is one on which the partial error-handling operation is to be performed, obtaining an erroneous byte offset and a length of irretrievable key-value data for each error encountered, and providing the erroneous byte offset and the length of the irretrievable key-value data to the host.

14. The method of claim 11, further comprising receiving multiple requests from the host for the key-value data, with each request being for a portion of the key-value data that does not include an error and returning retrievable portions of the key-value data to the host, circumventing portions in the key-value data including the error.

15. A key-value storage device communicatively coupled to a host device that transmits read commands to retrieve key-value data on a memory device, the storage device comprises: a processor to receive, from a host device, a command to retrieve key-value data from a memory device and determine that a portion of the key-value data is irretrievable from the memory device; and an error-handling module to identify, based on a key-value data type, an error-handling operation to be performed on the key-value data and execute one of an error concealment operation to conceal an error encountered when retrieving the key-value data stored as a single addressable object and a partial error-handling operation to provide retrievable portions of the key-value data to the host when a value in a key-value pair is a unique identifier;

wherein when a fragment of the key-value data is irretrievable, the error-handling module parses the key-value data to determine that the key-value data is one on which the error concealment operation is to be performed, establishes a start offset and an end offset of the key-value data, and executes the error concealment operation to recreate the key-value data;

wherein the processor returns, to the host, one of a complete value and a partial value.

* * * * *